(12) United States Patent
Giallorenzi et al.

(10) Patent No.: US 7,643,537 B1
(45) Date of Patent: Jan. 5, 2010

(54) SPREAD SPECTRUM SIGNAL DETECTION WITH INHIBITING FOR KNOWN SIDELOBE LOCATIONS

(75) Inventors: Thomas R. Giallorenzi, Herriman, UT (US); Matt Lake, Salt Lake City, UT (US); Samuel C. Kingston, Salt Lake City, UT (US); Johnny M. Harris, Centerville, UT (US)

(73) Assignee: L-3 Communications, Corp., New York, NY (US)

( * ) Notice: Subject to any disclaimer, the term of this patent is extended or adjusted under 35 U.S.C. 154(b) by 549 days.

(21) Appl. No.: 11/657,178

(22) Filed: Jan. 23, 2007

(51) Int. Cl.
*H04B 1/00* (2006.01)

(52) U.S. Cl. .................................................. 375/142

(58) Field of Classification Search ................ 375/140, 375/142, 143, 150, 152, 343; 704/216, 218, 704/237, 263; 708/5, 422, 813; 342/108, 342/145, 189, 378
See application file for complete search history.

(56) References Cited

U.S. PATENT DOCUMENTS

| | | | |
|---|---|---|---|
| 4,538,281 A | 8/1985 | Rajan | |
| 5,263,050 A * | 11/1993 | Sutterlin et al. | 375/142 |
| 5,796,775 A | 8/1998 | Aoyama | |
| 6,229,842 B1 | 5/2001 | Schulisht et al. | |
| 6,236,354 B1 | 5/2001 | Krasner | |
| 6,282,231 B1 | 8/2001 | Norman et al. | |
| 2002/0026282 A1 | 2/2002 | Turetzky et al. | |
| 2005/0099334 A1 | 5/2005 | Roh | |

OTHER PUBLICATIONS

Swaminathan, et al., A Technique to Improve the Performance of Serial, Matched-Filter Acquisition in Direct-Sequence Spread-Spectrum Packet Radio Communications, May 2005; IEEE Journal on Selected Areas in Communications, vol. 23, No. 5.

* cited by examiner

*Primary Examiner*—Sam K Ahn
(74) *Attorney, Agent, or Firm*—Kirton & McConkie; William T. Ralston (57) ABSTRACT

A method and apparatus for detecting a spread spectrum signal is described. Signals can be detected using correlation techniques. When a signal is detected, declaring of signal presence is inhibited for offsets of signal parameters from the parameters of the detected signal, where the offset corresponds to a known sidelobe of the spreading code. This helps to reduce false detections caused by sidelobes of the spreading code.

22 Claims, 7 Drawing Sheets

SPREAD SPECTRUM SIGNAL DETECTION WITH INHIBITING FOR KNOWN SIDELOBE LOCATIONS

FIELD OF THE INVENTION

The present invention relates generally to detection of spread spectrum signals. More particularly, the present invention relates spread spectrum signal detection where signal presence declaration is inhibited for offsets corresponding to known sidelobes of the spreading code.

BACKGROUND

Spread spectrum techniques have proven useful in a variety of communications applications, including cellular telephones, wireless local area networks, and military communications. Wireless spread spectrum systems operate by using a relatively large amount of spectrum bandwidth to communicate messages. The large bandwidth is consumed by spread spectrum encoding the message data using a pseudonoise code. The two most common types of spread spectrum transmission are frequency hopping, where the pseudonoise code is used to pseudo randomly change the transmission frequency on a periodic basis, and direct sequence, where the pseudonoise code is used to sequentially modulate the transmit signal at a high rate relative to the underlying message data. One advantage provided by spread spectrum techniques is the ability to build a transmitter which is difficult for an unauthorized user to detect.

Another advantage of spread spectrum techniques is the ability to share channels among multiple users. For example, in code division multiple access (CDMA), different pseudonoise codes are assigned to different users to be used as their spreading codes. Generally, when the receiver is dispreading a signal with a matching dispreading code, the signal is received and other users, having different spreading codes, are treated as interference and rejected. This aspect of spread spectrum is described further below.

In direct sequence spread spectrum, each sequence symbol of the pseudorandom code is referred to as a chip. The time duration of a chip is referred to as a chip time, and hence the chip rate (also referred to as "spreading code frequency") is the reciprocal of the chip time. The chip rate is typically an order of magnitude (or more) higher than the data rate of the underlying information to be transmitted, although lower ratios are sometimes used.

In order to detect a spread spectrum transmission, it is generally necessary to know the pseudonoise code beforehand. Furthermore, to extract the message data, it is generally necessary to know the timing of the pseudonoise code. For example, in a direct sequence system, this can be accomplished by knowing the code frequency (the rate at which the pseudonoise code advances through its chip sequence) and the starting time and position within the sequence of the pseudonoise code (sometimes referred to as the phase of the code). A signal for which the spread spectrum receiver knows the pseudonoise code, pseudonoise code phase and pseudonoise code frequency can be referred to as a synchronized signal.

One interesting property of spread spectrum systems is that unsynchronized signals appear as noise to a spread spectrum decoder, and are suppressed by the decoder. For example, as mentioned above, in CDMA different users can be assigned different pseudonoise codes, in which case a receiver will reject signals from users other than the specific user to whose code the receiver is synchronized. As another example, all users can be assigned a common pseudonoise code, but each user transmits using a different pseudonoise code start time. This results in each user having a different pseudonoise code phase. A receiver tuned to the common pseudonoise code at a particular timing (phase) will reject other users with different code timing (phase). This latter example is sometimes referred to as spread-ALOHA.

Detection of a spread spectrum signal can be performed by using correlation techniques. The spread spectrum signal is compared to a reference spreading code which is generated using a hypothesized code frequency and phase. When the reference spreading code has the same hypothesized code frequency and phase as the actual code frequency and phase of the input signal, a large correlation result is obtained. If, however, the reference spreading code is offset in code frequency or code phase from the input signal, a smaller result is obtained.

As is known in the art, the autocorrelation function of a code corresponds to the calculation of the correlation result when correlating a code with a time shifted version of itself. For an ideal code, the autocorrelation has a large peak result for time shifts of zero, and zero for all other time shifts. Unfortunately, there are few codes which have this ideal autocorrelation, and even those codes which are close to ideal often have other aspects which are undesirable (e.g., complexity or limited code length). For various reasons, many systems use non-ideal codes which have autocorrelation sidelobes. An auto correlation sidelobe is a local peak of the autocorrelation function.

While sidelobes are generally less than the peak value, sidelobes can be mistaken as the peak correlation value in some circumstances. For example, when searching for a spread spectrum signal by performing correlation, it can be difficult to distinguish a sidelobe from the actual correlation peak. Such sidelobe detections are sometimes referred to as false detections.

False detections are undesirable because it is generally not possible to detect message data since the sidelobe does not correspond to correct alignment between the reference code and the spread spectrum signal. Sidelobes can also be mistaken as additional signals, so even if the peak is properly detected, sidelobes can be mistaken as additional signals. False detections tie up resources, and thus are undesirable.

SUMMARY OF THE INVENTION

It has been recognized that it would be advantageous to develop a technique for inhibiting the declaring of a signal presence caused by sidelobes of the spreading code.

One embodiment of the invention includes inhibiting the declaring of a signal presence for signal parameter offsets from a detected signal corresponding to known sidelobe locations of the spreading code. For example, signal parameter offsets can include code phase differences, code frequency differences, and signal frequency differences. Inhibiting the declaring of a signal presence caused by a sidelobe can help to reduce false detections.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 1:
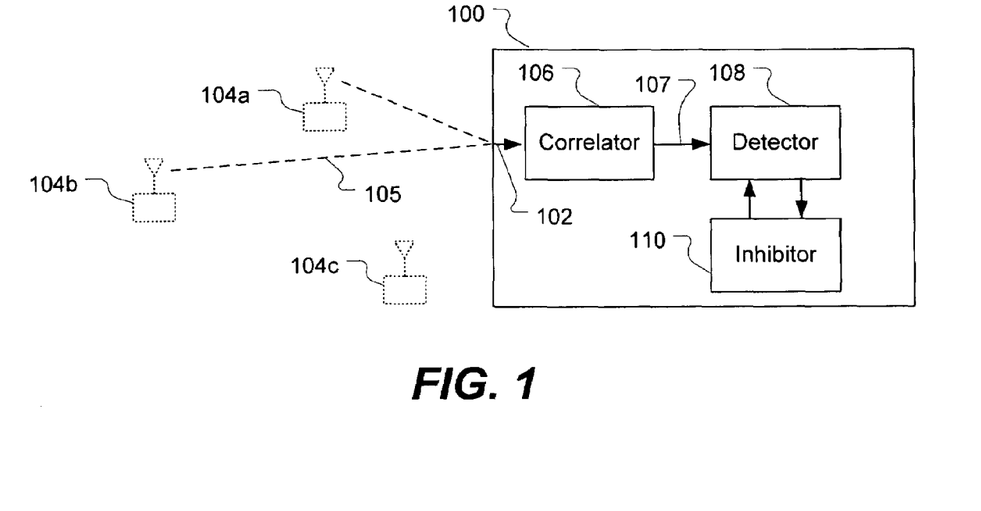
FIG. 1 is a block diagram of a system for detecting a spread spectrum signal in accordance with an embodiment of the present invention.

FIG. 1 illustrates a system for detecting a spread spectrum signal. The system, shown generally at 100, accepts a received signal 102 in which the spread spectrum signal may be embedded. The spread spectrum signal has a predefined spreading code, and may originate from one of several different transmitters. For example, transmitters 104 may transmit radio signals 105 to the system via a wireless communication channel in a spread ALOHA system.

The system 100 includes a means for correlating the received signal with a spreading code replica, such as a correlator 106. Correlation is performed for a plurality of different signal parameter hypotheses to produce a plurality of corresponding correlation results 107. Different signal parameter hypotheses may include different code phase offsets, different code frequencies, and different spread spectrum signal frequencies. Correlation can include comparing the received signal to a spreading code replica, where one of the received signal and spreading code replica is modified to correspond to the signal parameter hypothesis, for example by time shifting, phase shifting, or frequency shifting.

For example, in a spread ALOHA system, correlation may be performed over all possible code phase offsets for the spreading code used by the system using a parallel correlator. Commonly-owned co-pending U.S. patent application Ser. No. 11/351,464, entitled "Spread Spectrum Detection System and Method," and Ser. No. 11/351,465, entitled "Correlation Apparatus and Method for Accommodating Spreading Code Frequency Offset, both filed Feb. 10, 2006, each hereby incorporated by reference, describe systems which include correlation and searching techniques that can be applied to embodiments of the present invention.

The system 100 also includes a means for processing the correlation results 107 to detect spread spectrum signals, such as a signal detector 108. The signal detector can declare a signal detection when the correlation result meets a predetermined criterion, for example, when the correlation result exceeds a threshold. The threshold may be predetermined or dynamically set based on signal statistics, noise statistics, sidelobe levels, or a combination as is discussed further below.

Figure 2:
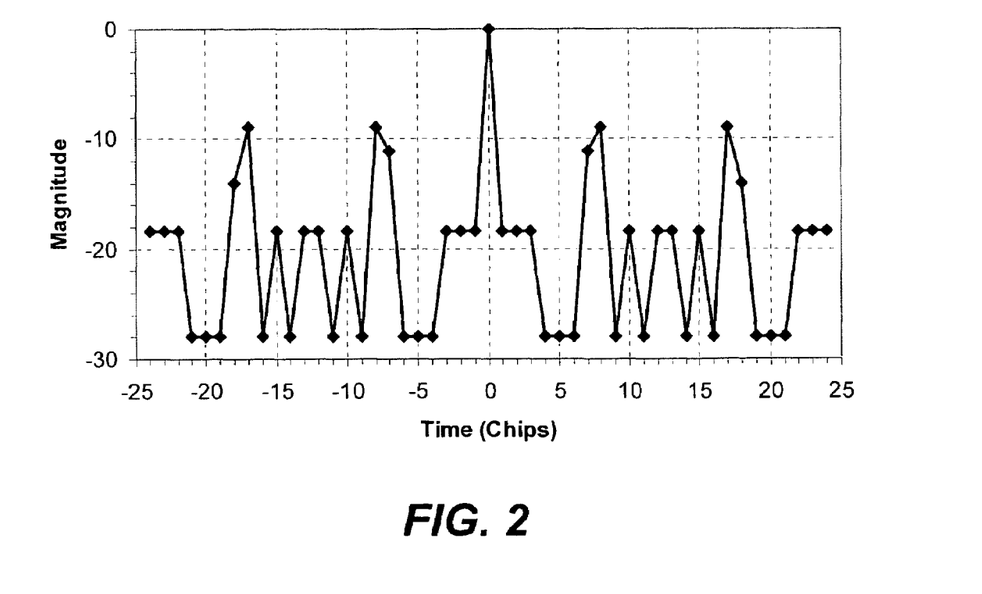
FIG. 2 is a plot of the autocorrelation for an exemplary spreading code in accordance with an embodiment of the present invention.

It should be appreciated that correlation sidelobes for a strong signal may appear similar to the peak autocorrelation value for a weaker signal. FIG. 2 illustrates the autocorrelation function for a hypothetical spreading code of length N. It can be seen that some correlation sidelobes are down only approximately 9 dB from the peak. Consider a strong spread spectrum signal being received from a nearby transmitter (e.g., 104$a$ in FIG. 1). The strong signal will result in large correlation results, both for the peak and for sidelobes. In contrast, a weak spread spectrum signal being received from a far away transmitter (e.g., 104$b$) will result in a small correlation peak (and even smaller sidelobes). If the difference between the weak signal and the strong signal is more than 9 dB, the correlation sidelobes from the strong signal will exceed the correlation peak for the weak signal.

To assist in differentiating between correlation sidelobes and peaks, the system 100 can include a means for inhibiting the detection of additional spread spectrum signals, such as inhibitor 110. When a signal is detected, the system knows that the sidelobes will cause large correlation peaks to occur in addition to the peak correlation corresponding to synchronization of the reference code. These sidelobe peaks will occur at offsets from the detected signal's signal parameters, with the offsets corresponding to the sidelobes of the spreading code. For example, for the autocorrelation function shown in FIG. 2, the sidelobe at a time offset of +8 chips will result in a correlation sidelobe offset at +8 chip times from the peak correlation. Detection is therefore inhibited at the offset of +8 chip times from the peak, since this is a known sidelobe, and a large correlation result at that offset is likely due to sidelobe for the already detected signal. In general, detection can be inhibited for multiple offsets that correspond to sidelobes of the autocorrelation of the spreading code.

Figure 3:
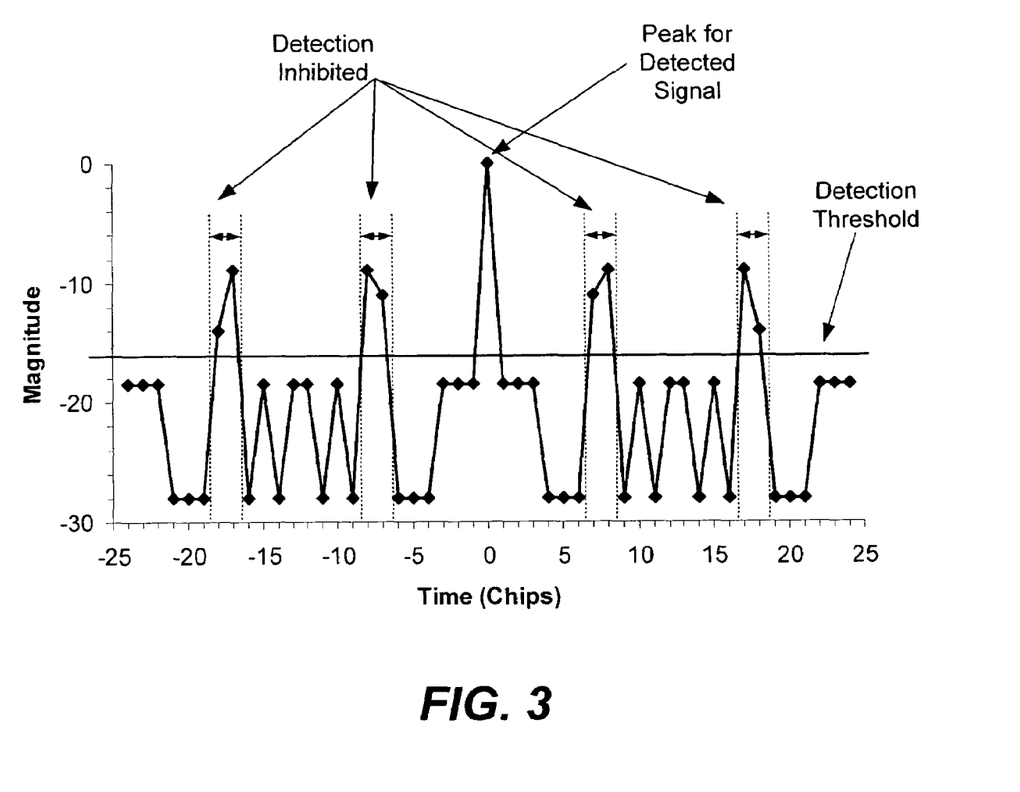
FIG. 3 is the autocorrelation plot of FIG. 2 with a superimposed signal detection threshold and identification of offsets for which detection is inhibited in accordance with an embodiment of the present invention.

FIG. 3 illustrates the autocorrelation function for the predefined spreading code of FIG. 2, showing a signal detection threshold of −16 dB and offsets for which detection is inhibited.

Thus, if a signal is detected at code phase X, further signal detections are inhibited for code phase offsets of X±7, X±8, X±17, and X±18. This is because large correlation sidelobes will appear at those positions, which could otherwise be mistaken as additional signals. While four offset locations have been inhibited in this example, a larger or smaller number may be used depending on the number and magnitude of the sidelobes and the detection thresholds used. As can be seen, these sidelobes are significant because they rise above the threshold used for detection. Inhibiting detection at offsets which have small sidelobes may not be necessary.

It addition to the offsets corresponding to the peak of the sidelobe, it may also be desirable to inhibit acquisition at additional offsets near the peak of the sidelobe. For example, for correlation samples taken at one chip intervals in code phase, a signal falling halfway between two code phase hypotheses will result in a large correlation peak (and sidelobes) for two adjacent code phases. Hence, in addition to the known sidelobe location, one or more adjacent signal parameter hypotheses may also be inhibited to take into account this effect.

In general, the particular offsets for which inhibiting signal detection is performed is a function of the signal detection threshold and the autocorrelation of the spreading code. This represents a design selection which may vary for different applications. While a lower detection threshold can result in a higher detection probability, this is at increased risk of false detections. A lower detection threshold can also make the system more sensitive to sidelobes, and hence lower thresholds can correspond to increased numbers of offsets for which detection is inhibited. As the detection threshold is lowered, and more sidelobes are taken into account in the inhibitor, increased signal level variation (and thus increased near-far range) can be accommodated. Hence, depending on the requirements of the system, selecting a lower or higher threshold may be desirable, which in turn helps determine which sidelobes are large enough that signal detection should be inhibited at that location.

While the system 100 helps reduce the possibility of mistaking sidelobes as legitimate signals, the system also helps maintain a high probability of detecting additional spread spectrum signals at other offsets in signal parameters. For spreading codes which a small number of sidelobes, it will be appreciated that only a few discrete offsets are inhibited, and thus remaining offsets are still available for detection of other spread spectrum signals.

Preserving the ability to detect additional signals can be quite helpful in a spread ALOHA system, since transmissions from different transmitters may have different code phases but overlap in time. It can be seen from FIG. 3, that as long as the second transmission has a code phase that does not fall into one of the inhibited regions, it can also be detected, even though it overlaps in time with a previously detected transmission. Accordingly, by inhibiting signal detection only for offsets that correspond to relatively high sidelobe levels, a high probability of detection for subsequent signals can be maintained. For example, in FIG. 3, since 8 of the 50 possible code phases are inhibited, 84% of the code phases remain available for detecting additional signals.

Alternate approaches to dealing with sidelobes, such as simply using a higher threshold or providing a verification step, do not obtain these same benefits. Raising the detection threshold for all signal parameter hypotheses, while it can help to avoid false alarms, reduces the range of the system. In such a situation, the threshold is increased to above the highest sidelobe to avoid false alarms. Weaker signals (e.g., corresponding to farther away transmitters) may fail to exceed the threshold. Even one high level sidelobe can cause a severe limitation in the communication range with this approach. For example, in FIG. 3, if no inhibiting is performed, the detection threshold is set to about −7 dB to avoid false alarms due to the sidelobes. Accordingly, this sets the maximum range of the system, since signals below this level are unlikely to be detected. In contrast, by including the inhibitor 110, the system 100 allows the nominal threshold to be set significantly lower, for example, to −16 dB. This allows detection of signals that are 9 dB lower, extending the communication range.

Another alternate approach to handling sidelobes is to perform a verification step before declaring signal presence. For example, additional correlations or other tests can be performed in an attempt to reject sidelobes. While performing a verification step can help to eliminate false alarms, verification requires additional processing resources and time. In a spread ALOHA system, where transmissions may be of limited duration, performing this additional processing can be undesirable. The system 100 helps to avoid a separate verification step or other processing since false detections are reduced by the inhibitor 110.

Another advantage of the system 100 is that the required processing resources can be reduced relative to a system which simply accepts the resulting false detections caused by sidelobes. In the example of FIG. 2, since there are 8 large sidelobes, a strong signal could potentially cause, in addition to the correct signal detection, 8 false detections if no inhibitor 110 is used. These false detections can cause the system to commit resources to attempt to receive signals corresponding to those sidelobes. If limited resources are available, later signals may not be processed because inadequate resources are available. Alternately, knowing that each signal detections may result in 8 additional false detections, a factor of 9 times as many receive recourses could be provided—a clearly inefficient approach. The inclusion of the inhibitor helps to avoid either of these undesirable situations by making use of the knowledge of the autocorrelation function to reduce the false detections which occur.

Figure 4:
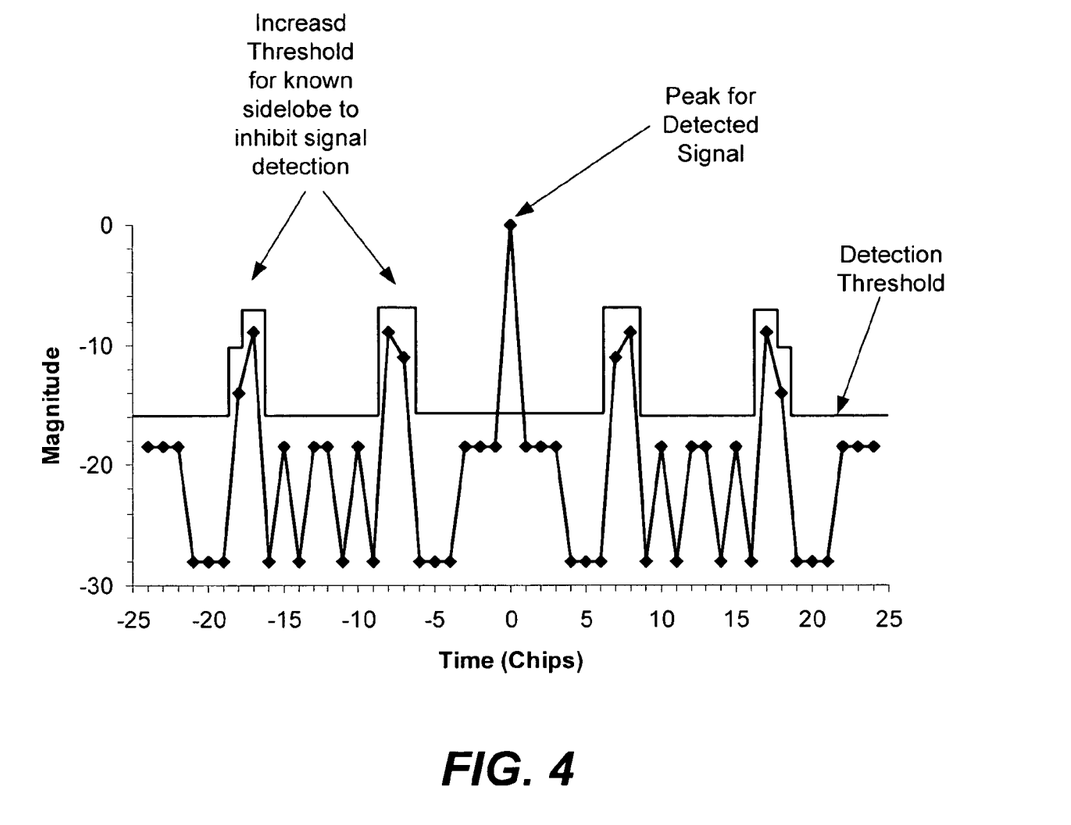
FIG. 4 is the autocorrelation plot of FIG. 2 with a superimposed signal detection threshold which is varied by delta amounts based on the sidelobe level of the spreading code in accordance with an alternate embodiment of the present invention.

Turning to the details of the inhibitor, various way of inhibiting signal detection for a particular signal parameter hypothesis can be used. Inhibiting detection can be performed by entirely disabling the signal detector when testing for signal presence at signal parameter hypotheses corresponding to a known sidelobe. Inhibiting detection can also be performed by raising the detection threshold at signal parameter hypotheses corresponding to known sidelobes. The threshold can be raised by a delta amount corresponding to the known sidelobe of the predefined spreading code. For example, FIG. 4 illustrates threshold values which are varied as a function of the offset, the variation based on the sidelobe level. Before a signal is detected, the nominal signal detection of −16 dB is used. This nominal threshold value is set based on the characteristics of the system (e.g., signal to noise ratio, detection probability, false alarm rate, pseudonoise code length, etc.). When a signal is detected, the detection threshold is varied by delta amounts for offsets from the detected signal as shown in FIG. 4 (where the detected signal is referenced to chip time 0). The threshold delta amounts for the various offsets (from a detected signal) are based on the sidelobe levels. The nominal threshold is increased to a threshold of −7 dB for offsets of ±7, ±8, and ±17 since these are relatively high sidelobes. The nominal threshold is increased by less, to −10 dB, for offsets of ±18, since this sidelobe is lower in level. Actual threshold adjustments in a particular system implementation may be determined analytically based on the characteristics of the system and sidelobe levels or by simulation.

In general, for higher sidelobe levels, higher thresholds are used. This correspondence need not be one-to-one, however, since detection statistics are also dependent on the signal to noise ratio. Generally, the threshold will be a function of the sidelobe level plus a margin to account for noise, where the margin can generally be smaller for higher signal to noise ratio (and higher sidelobe levels).

Raising the detection threshold (as shown in FIG. 4) to inhibit signal detection, rather than completely disabling signal detection (as shown in FIG. 3) can provide an advantage in that legitimate signals can still be detected at the inhibited hypothesis, such as a sufficiently strong signal. For example, if a first signal is detected which is relatively weak, it will some signal parameter hypotheses to be tested for signal presence using a higher threshold. If a second, stronger, signal comes along, with signal parameters corresponding to a sidelobe of the first signal, its peak correlation result will fall on top of the sidelobe of the first signal. Even though the threshold has been increased, if the second signal is sufficiently strong its peak correlation result will exceed the threshold and result in a detection. This improved performance, however, comes at the cost of increased implementation complexity, since the different thresholds to be used are kept track of during operation. Hence, the choice of which approach to use is a design decision depending on the particular details of the application.

Inhibiting the detection of additional spread spectrum signals at the sidelobe locations need only be performed for a limited period of time after a signal detection corresponding to a time duration over which the detected signal may produce a high sidelobe correlation result. For example, if the spread spectrum signals are burst signals of limited duration, inhibiting may be performed for a time duration corresponding to the burst length. Alternately, inhibiting may be performed for a shorter time, such as the preamble length of the spread spectrum signals. Inhibiting detection for the preamble length may be adequate if data modulation following the preamble introduces enough randomness that the sidelobe correlations are adequately reduced. Inhibiting detection for the preamble length may also be adequate if a different spreading code which lacks high sidelobes is used after the preamble. In general, inhibiting detection can be performed for a predetermined time interval after a signal is detected.

As another alternative, inhibiting detection may be performed for a time interval determined dynamically, for example, using a burst receiver which can identify the end of the preamble or the end of the transmission. Commonly-owned, co-pending U.S. patent application Ser. No. 11/11/351,608, filed Feb. 10, 2006, entitled "System and Method for Receiving Spread Spectrum Encoded Bursts Using a Common Spreading Code," describes a receiver architecture having multiple burst receivers which can be used within embodiments of the present invention and is herein incorporated by reference.

It will be appreciated that multiple spread spectrum signal bursts may be received, some of which overlap in time, even though they have different code phases. In this situation, the system 100 can keep track of each detected signal and inhibit detection of other spread spectrum signals at offsets from the detected signal corresponding to known sidelobes for a time interval based on the detection of each detected signal.

Figure 5:
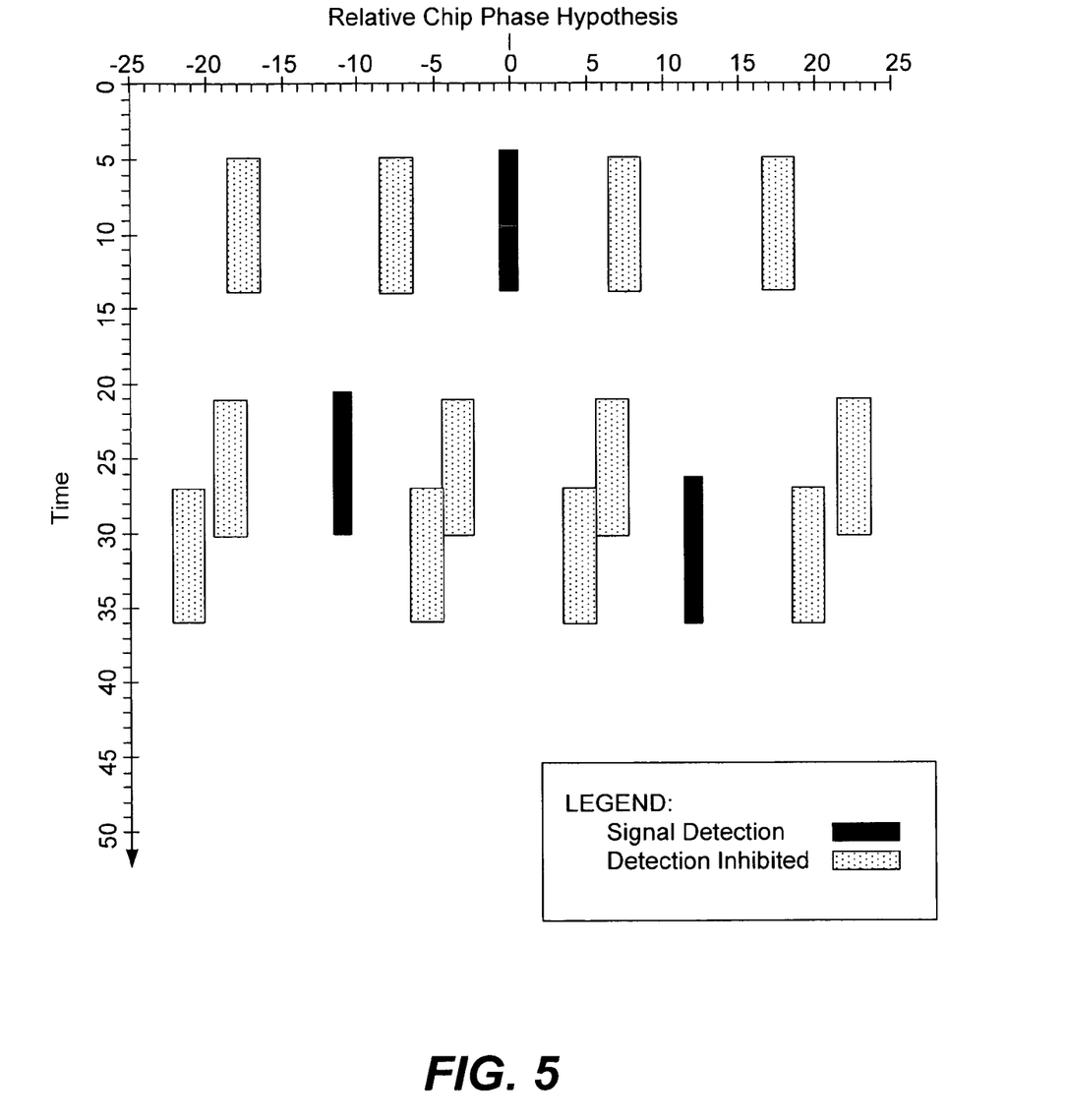
FIG. 5 is a timing diagram showing various exemplary signal detections and the corresponding offsets for which detection is inhibited based on the autocorrelation plot of FIG. 2 in accordance with an embodiment of the present invention.

For example, FIG. 5 illustrates a timing diagram showing various signal detections and corresponding offsets for which detection is inhibited. The horizontal axis shows the possible chip phase hypotheses, and the vertical axis shows time, with time advancing in the downward direction. As each signal is detected, sidelobe locations are determined and inhibited for the appropriate time duration. At time t=5, a signal detection occurs at chip phase 0, represented by the solid box. Hence, signal detection is inhibited for chip phases at offsets of ±7, ±8, ±17 and +18 relative to 0. Signal detection is inhibited until time t=14, which corresponds to the end of the preamble for the signal detected at chip phase 0. At time t=14, since the preamble is gone, the risk of sidelobes from the detected signal at chip phase 0 is also gone, so signal detection can be re-enabled at all chip phases.

At time t=21, another signal is detected, this time at chip phase −11. Signal detection is now inhibited for offsets corresponding to known sidelobes (±7, +8, ±17 and ±18) relative to the detected chip phase (−21). Hence, signal detection is inhibited for chip phases of:

−11−18=−29 or +21

−11−17=−28 or +22

−11−8=−19

−11−7=−18

−11+7=−4

−11+8=−3

−11+17=+6

−11+18=+7

Not that, because autocorrelation is symmetric about zero, this offset math is performed modulo N, where N is the code length.

At time t=27, another signal is detected at chip phase +12. Even though the signal at chip phase −11 is still present, the signal at chip phase +12 can be detected because it does not fall in a sidelobe of the signal at chip phase −11. Additional chip phase offsets are then inhibited to correspond to the signal at chip phase +12, these offsets being calculated in a similar manner to yield:

+12−18=−6

+12−17=−7

+12−8=+4

+12−7=+5

+12+7=+19

+12+8=+20

+12+17=+29 or −21

+12+18=+30 or −20

At time t=30, the preamble from the signal at code phase −11 is gone, so declaring signal presence is no longer inhibited for some code phases. At time t=36, the preamble from the signal at code phase +12 is also code, so declaring signal presence is re-enabled for additional code phases.

From the foregoing, it can be seen that there can be a large number of code phase offsets for which acquisition is being inhibited to keep track of, along with corresponding removal of the inhibiting at a later time. This becomes even more complex when additional signal parameter hypothesis, such as code frequency or carrier frequency are included. Keeping track of the signal parameter hypothesis for which declaring a signal presence is to be inhibited can be efficiently performed using a microprocessor, microcontroller, or the like, which is programmed accordingly.

Figure 6:
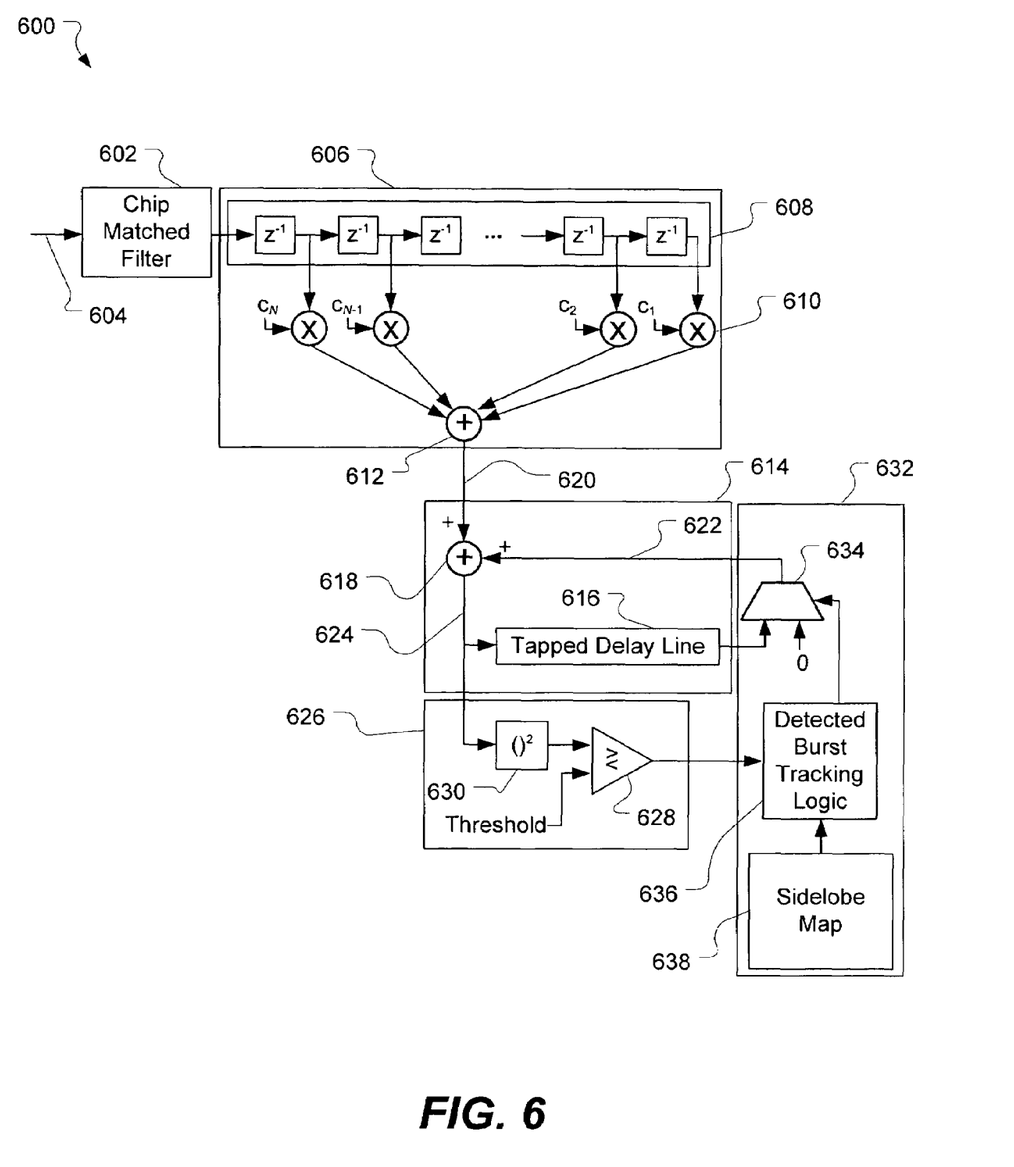
FIG. 6 is a block diagram of a detailed implementation of a system for detecting a spread spectrum signal in accordance with another embodiment of the present invention.

FIG. 6 illustrates a block diagram of a detailed implementation of a system for detecting a spread spectrum signal in accordance with another embodiment of the present invention. The system 600 includes a chip matched filter 602 which accepts the received signal 604 and performs chip level matched filtering. As will be appreciated, antennas, downconverters, and other receiver components may also be included in the system, the location and configuration of which, although not shown, will be apparent to one of ordinary skill in the art. The output of the chip matched filter is provided to a correlator 606. The correlator can be implemented using a first tapped delay line 608, a plurality of multipliers 610, a summer 612, and a plurality of integrators 614 coupled to the summer. The plurality of integrators has been implemented here using a second tapped delay line 616 which recirculates through a summer 618. It will be appreciated that the recirculating summation provides a first order recursive filter. A scaling operation, such as a multiplier (not shown) can be included in the feedback path if desired.

The received signal 604, after matched filtering, is sampled and stored in the first tapped delay line 608. The tap spacing in the first tapped delay line can be one chip time or less, and is shown here as one chip time. The outputs of the first tapped delay line therefore correspond to a plurality of time delayed samples of the input signal. The time delayed samples of the input signal are multiplied by the chips of the predefined spreading code $\{c_0, c_1, \ldots c_N\}$ and summed to form a correlation sample 620. New correlation samples are produced at chip time intervals.

Successive correlation samples 620 correspond to successive chip phase hypotheses (also called chip slips). For a code of length N, there are N possible different chip phase hypotheses.

Hence, each correlation sample is summed with a correlation result 622 from N chip times previously, to produce an updated correlation result 624. N different correlation results are maintained, corresponding to the N different possible chip phase hypotheses. Performing this summation can be accomplished efficiently using the second tapped delay line 616 to store the correlation results and updating one correlation result each chip time by adding the correlation sample to the previous correlation result.

The system 600 also includes a signal detector 626. Signal detection can be performed by comparing the correlation results 624 to a threshold using a comparator 628. Before comparing, it may be desirable to perform an envelope detection, such as magnitude-squared 630. Signal presence is declared when the correlation result (or magnitude or square thereof) exceeds the threshold. The threshold may be set based on a desired detection probability and false alarm rate using techniques known to one skilled in the art.

The system 600 also includes an inhibitor 632. The inhibitor can be implemented by inserting a multiplexer 634 into the recirculation path of the second tapped delay line 616. The inhibitor includes logic 636 to track detected bursts and zero out the correlation results for chip phase hypotheses that correspond to the known sidelobes. The known sidelobes can be stored in a sidelobe map 638 in a memory.

In an alternate embodiment, the multiplexer can be replaced with a summer and correlation results at offsets from the chip phase hypothesis that correspond to the known sidelobes can have a portion subtracted off to produce the same effect as an increased threshold. As yet another alternate embodiment, the multiplexer can be replaced with a multiplier and correlation results at offsets from the chip phase hypothesis that correspond to the known sidelobes can be scaled to produce the same effect as an increased threshold.

It will be appreciated that the correlator 606 provides a substantially simultaneous correlation for all of the chip phase offsets. The correlation is not exactly simultaneous, since each chip phase is updated at a different time. The effect of the correlator, however, is to regularly update the plurality of correlation results 624, so that the peak correlation of a signal will be detected quickly (within a few chip times) after it meets the predefined detection criteria. Since sidelobe correlation results are smaller, when the peak is detected, the sidelobes can be inhibited before they also cross threshold. Although not shown here, the correlator can also include additional circuitry which performs correlation corresponding to different code frequency hypotheses and different carrier frequency hypotheses which performs correlations substantially simultaneously for all of the signal parameter hypotheses. For example, see U.S. patent application Ser. No. 11/351,464 cited above for an exemplary correlator which performs a three dimensional search in code phase, code frequency and signal frequency.

Figure 7:
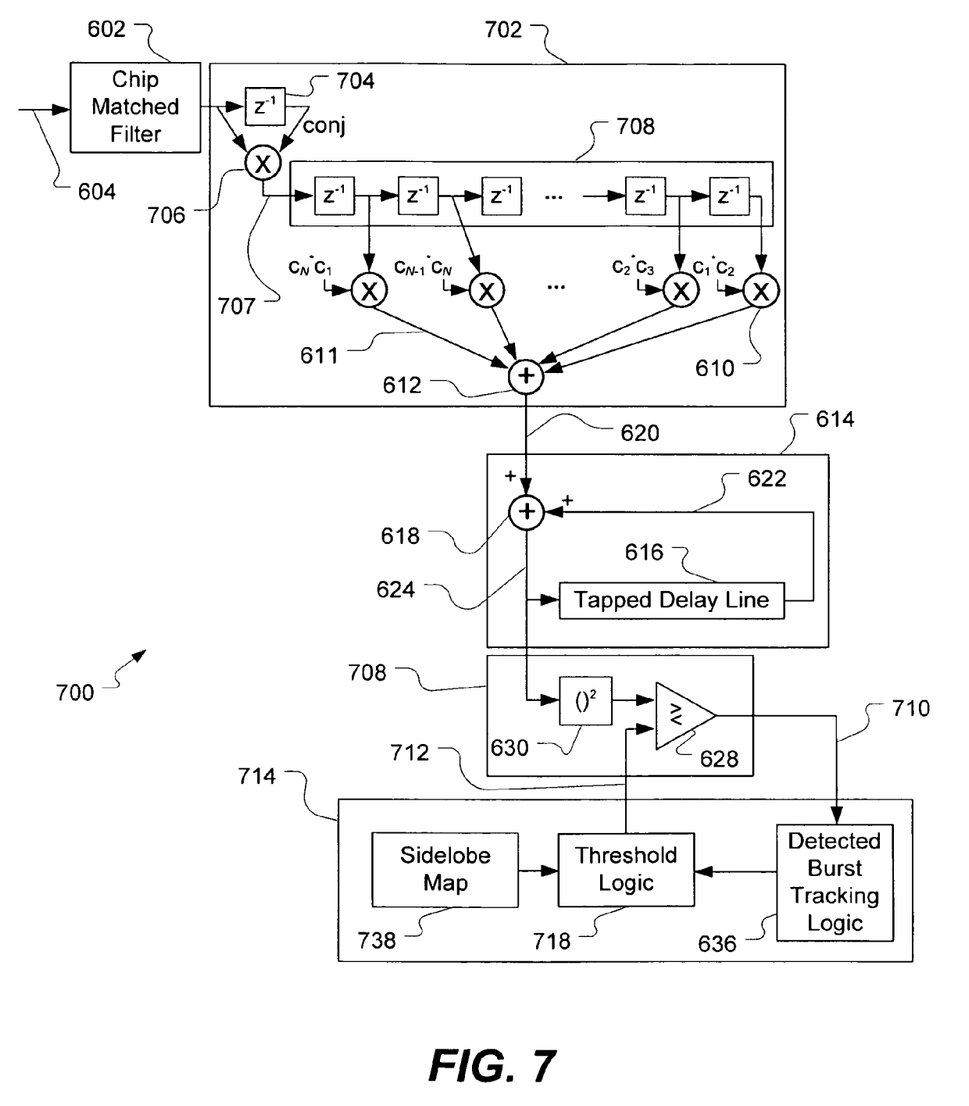
FIG. 7 is a block diagram of a detailed implementation of a system for detecting a spread spectrum signal in accordance with another embodiment of the present invention.

FIG. 7 illustrates a block diagram of a detailed implementation of another system 700 for detecting a spread spectrum signal in accordance with another alternate embodiment of the present invention. In this system, the correlation is performed using cross products. Such an approach can prove useful, for example, where there is a large frequency error, such as Doppler offset. When there is a large frequency error, carrier phase can rotate during the correlation time, causing a reduction in the correlation result. For example, see commonly-owned co-pending U.S. patent application Ser. No. 11/540,139, entitled System and Method for Determining a Fine Frequency Offset of a Received Signal and Ser. No. 11/540,136, entitled System and Method for Detecting a Presence and Frequency Offset of a Spread Spectrum Radio Frequency Signal, both filed on Sep. 28, 2006, and each incorporated herein by reference, which describe spreading code formats and correlation techniques which can be used in embodiments of the present invention.

The correlator 702 is configured to perform cross product correlation of the received signal 602. The correlator includes a multiplier 704 and delay element 706 to form cross product samples 707 of the received signal by performing a conjugate multiplication. The cross product samples are then provided to a tapped delay line 708, which provides time delayed output samples of the cross product samples signal at a plurality of taps. The time delayed cross product samples are multiplied by cross product chips of the spreading code using a plurality of multipliers 610 to form a plurality of product terms 611. The product terms are then summed in summer 612 to form the correlation samples 620. A new correlation sample can be produced each chip time.

A plurality of integrators 614 sums the correlation samples 620 to form a plurality of correlation results corresponding to the plurality of code phase hypotheses, as described above.

A signal detector 708 declares signal presence 710 when a correlation result exceeds threshold 712. The threshold is determined by the inhibitor 714. When no signals have been detected, the threshold is set to a nominal value. When a signal is detected, the threshold is adjusted based on known sidelobe levels of the spreading code to inhibit the declaring of signal presence. For example, at locations where there are high sidelobes, the threshold will be increased. The adjustment of the threshold can be based on the level of the sidelobes, for example, as described above and illustrated in FIG. 4. The detected burst tracking logic 636 can keep track of the signal parameter hypotheses at which signals have been detected, and the threshold logic 718 can use the sidelobe map 738 to determine what value of threshold to use for each signal parameter hypothesis. The sidelobe map and threshold logic can be implemented in software running on a microprocessor, microcontroller, or the like. The sidelobe map can include sidelobe locations and levels corresponding to the autocorrelation function for the cross product spreading code.

In general, the sidelobe map corresponds to the known sidelobes for the spreading code, taking into account the type of correlation performed during searching. For example, as described above, the sidelobes may be from the autocorrelation function of the spreading code or the autocorrelation function for the cross product spreading code. As another example, the correlator used for searching may use a different (mismatched) code than the spreading code. In such a case, the sidelobes are of the cross correlation of the spreading code and the reference code used in the correlator.

Figure 8:
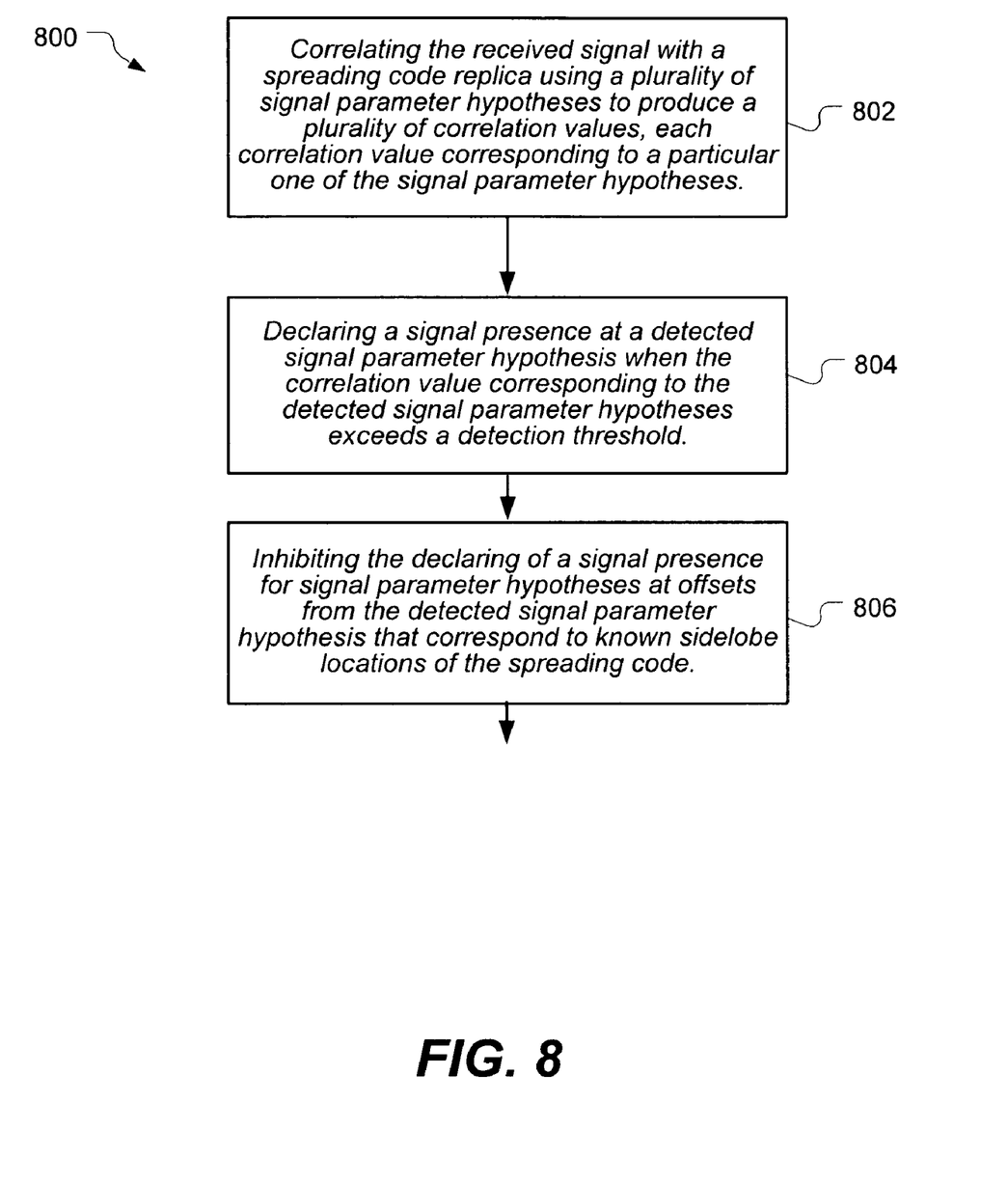
FIG. 8 is a flow chart of a method for detecting a spread spectrum in accordance with an embodiment of the present invention.

In accordance with another embodiment of the present invention, a method for detecting a spread spectrum signal from within a received signal will now be described in conjunction with FIG. 8. The spread spectrum signal is encoded with a spreading code. The method 800 includes correlating 802 the received signal with a spreading code replica using a plurality of signal parameter hypotheses to produce a plurality of correlation values. As discussed above, the signal parameter hypotheses may include code phase. Each correlation value corresponds to a particular one of the signal parameter hypotheses. Various techniques for correlating are described above.

A next step of the method 800 is declaring 804 a signal presence at a detected signal parameter hypothesis when a correlation value exceeds a detection threshold. The signal parameter hypothesis corresponding to the correlation value which exceeds the detection threshold can be referred to as the detected signal parameter hypothesis. For example, various techniques for declaring signal presence are described above. Declaring a signal presence can include outputting a signal which indicates signal presence to activate other functions (e.g., a burst receiver), implementing a software procedure, and similar activities.

The method 800 also includes inhibiting 806 the declaring of a signal presence for signal parameter hypotheses offset from the detected signal parameter hypothesis is inhibited. The offsets correspond to known sidelobe locations of the spreading code. For example, various ways of inhibiting declaring of signal presence are described above.

While the discussion heretofore has focused principally on the example where the signal parameter hypotheses are different code phases, signal parameter hypotheses can correspond to different aspects of the signal, such as code frequency, signal frequency, or other parameters. It should be appreciated that various techniques for correlation can be applied, and that depending on the correlation technique and signal parameter, different sidelobes can occur. For example, when the signal parameters include signal frequency, there may be certain signal frequency offsets which result in high correlation sidelobes for which detection is also inhibited. Accordingly, while the systems and methods have been illustrated as though the signal parameter hypotheses span one dimension (e.g. code phase, as shown in FIGS. 2-4), the signal parameter hypotheses can span multiple dimensions. Offsets corresponding to known sidelobes can therefore also be multi-dimensional (e.g., in code phase, code frequency and signal frequency).

Systems and methods in accordance with the present invention can prove particularly useful in systems using a composite spreading code. A composite spreading code can be generated by multiplying two different spreading codes together, where the codes are generated at different rates. For example, a first code of length 10 and a second code of length 1000 can be used to generate a length 10,000 code by running the second code at $1/10^{th}$ the rate of the first code. Composite codes can prove helpful for simplifying acquisition. Composite codes, however, often have a number of very high sidelobes which can result in false detections. By applying the presently disclosed techniques, the signal detection performance of a system using composite codes can be improved.

In general, embodiments of the present invention can help to reduce false detections caused by sidelobes in most spread spectrum systems. Once a signal is detected, false detections caused by sidelobes can be inhibited. This helps to reduce usage of processing resources (e.g., burst receivers or detection verifiers) while minimizing reduced probability of detection for overlapping transmissions (e.g., in a spread ALOHA system).

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for detecting a spread spectrum signal within a received signal, the spread spectrum signal being encoded with a spreading code, the method comprising:
   correlating the received signal with a spreading code replica using a plurality of signal parameter hypotheses to produce a plurality of correlation values, each correlation value corresponding to a particular one of the signal parameter hypotheses;
   declaring a signal presence at a detected signal parameter hypothesis when the correlation value corresponding to the detected signal parameter hypotheses exceeds a detection threshold; and
   inhibiting the declaring of a signal presence for signal parameter hypotheses at offsets from the detected signal parameter hypothesis that correspond to known sidelobe locations of the spreading code.

2. The method of claim 1, wherein the step of inhibiting the declaring of a signal presence comprises increasing the detection threshold.

3. The method of claim 2, wherein increasing the detection threshold comprises increasing the detection threshold by delta amounts based on known sidelobe levels at the known sidelobe locations.

4. The method of claim 1, wherein the step of inhibiting the declaring of a signal presence comprises disabling the declaring of a signal presence.

5. The method of claim 1, wherein the step of inhibiting the declaring of a signal presence comprises inhibiting the declaring of a signal presence for a predetermined time interval.

6. The method of claim 5, wherein the predetermined time interval is equal to a preamble length of the spread spectrum signal.

7. The method of claim 1, wherein the step of inhibiting the declaring of a signal presence comprises inhibiting the declaring of a signal presence for signal parameter hypotheses adjacent to offsets corresponding to known sidelobe locations of the spreading code.

8. The method of claim 1, wherein the spreading code is a multi-layer pseudonoise code.

9. The method of claim 1, wherein the signal parameter hypotheses are chosen from the group consisting of a spreading code phase, a spreading code frequency, a spread spectrum signal carrier frequency, and combinations thereof.

10. The method of claim 1, wherein the step of correlating the received signal comprises:
    multiplying samples of the received signal by samples of the spreading code replica to produce product samples for each signal parameter hypothesis, wherein at least one of the received signal and spreading code replica are modified to correspond to the signal parameter hypothesis; and
    accumulating the product samples to form the correlation value corresponding to the signal parameter hypothesis.

11. The method of claim 10, wherein the step of accumulating the product samples comprises recursively filtering the product samples.

12. The method of claim 1, wherein the step of correlating the received signal comprises:
    multiplying samples of the received signal together to produce a plurality of cross products;

multiplying the plurality of cross products by cross product samples of the spreading code replica to produce product samples for each signal parameter hypothesis, wherein at least one of the received signal and spreading code replica are modified to correspond to the signal parameter hypothesis; and accumulating the product samples to form the correlation value corresponding to the signal parameter hypothesis.

13. The method of claim 1, wherein the step of correlating the received signal is performed substantially simultaneously for the plurality of signal parameter hypotheses.

14. A system for detecting a spread spectrum signal having a predefined spreading code and embedded within a received signal, the system comprising:

a correlator configured to accept the received signal and produce a plurality of correlation results corresponding to a plurality of signal parameter hypotheses;

a signal detector operatively coupled to the correlator and configured to declare a signal detection when a correlation result meets a predetermined criteria, an inhibitor operatively coupled to the signal detector and configured to inhibit the signal detector from declaring additional signal detections for signal parameter hypotheses that are offset from the signal parameter hypothesis corresponding to the signal detection, the offsets being amounts corresponding to known sidelobes of the predefined spreading code.

15. The system of claim 14, wherein the correlator, comprises:

a tapped delay line configured to accept samples of the received signal and output a plurality of time delayed samples at a plurality of corresponding taps;

a plurality of multipliers, each multiplier coupled to one tap of the tapped delay line and configured to multiply the time delayed sample by a chip of the spreading code to produce a product term;

a summer coupled to the plurality of multipliers and configured to sum the product terms to form a correlation sample; and a plurality of integrators coupled to the summer and configured to sum the correlation samples over time to form the plurality of correlation results.

16. The system of claim 14, wherein the correlator, comprises:

a multiplier configured to form cross product samples of the received signal;

a tapped delay line configured to accept cross product samples of the received signal and output a plurality of time delayed samples at a plurality of corresponding taps;

a plurality of multipliers, each multiplier coupled to one tap of the tapped delay line and configured to multiply the time delayed sample by a cross product chip of the spreading code to produce a product term;

a summer coupled to the plurality of multipliers and configured to sum the product terms to form a correlation sample; and a plurality of integrators coupled to the summer and configured to sum the correlation samples over time to form the plurality of correlation results.

17. The system of claim 14, wherein the inhibitor is configured to disable the signal detector for signal parameter hypotheses that are offset from the detected signal parameters by offset amounts corresponding to known sidelobes of the predefined spreading code.

18. The system of claim 14, wherein the signal detector comprises a comparator coupled to the correlator and configured to declare a detection when the correlation result exceeds a threshold.

19. The system of claim 18, wherein the inhibitor is configured to increase the threshold for signal parameter hypotheses that are offset from the detected signal parameters by delta amounts corresponding to known sidelobes of the predefined spreading code.

20. The system of claim 18, wherein the inhibitor is configured to zero the correlation result for signal parameter hypotheses that are offset from the detected signal parameters by offset amounts corresponding to known sidelobes of the predefined spreading code.

21. A system for detecting spread spectrum signals having a predefined spreading code and embedded within a received signal, the system comprising:

means for correlating the received signal with a spreading code replica to produce a plurality of correlation results corresponding to a plurality of signal parameter hypotheses;

means for processing the plurality of correlation results to detect spread spectrum signals;

means for inhibiting the detection of additional spread spectrum signals at signal parameter hypotheses that are at offsets from the signal parameter hypotheses of detected spread spectrum signals, wherein the offsets correspond to known sidelobes of the predefined spreading code.

22. The system of claim 21, wherein the means for inhibiting the detection comprises means for increasing a signal detection threshold by an amount corresponding to the known sidelobe of the predefined spreading code, the signal detection threshold being increased for a duration corresponding to a predefined preamble duration.

* * * * *

UNITED STATES PATENT AND TRADEMARK OFFICE
CERTIFICATE OF CORRECTION

PATENT NO. : 7,643,537 B1
APPLICATION NO. : 11/657178
DATED : January 5, 2010
INVENTOR(S) : Giallorenzi et al.

Page 1 of 1

It is certified that error appears in the above-identified patent and that said Letters Patent is hereby corrected as shown below:

In column 7, line 62, "$\pm 7, +8, \pm 17$ and $\pm 18$" should be "$\pm 7, \pm 8, \pm 17$ and $\pm 18$"

Signed and Sealed this

Twenty-seventh Day of April, 2010

David J. Kappos
*Director of the United States Patent and Trademark Office*